Dec. 31, 1929.  H. LEVINE  1,741,194
RODENT OR THE LIKE DIET CUP
Filed Dec. 5, 1927
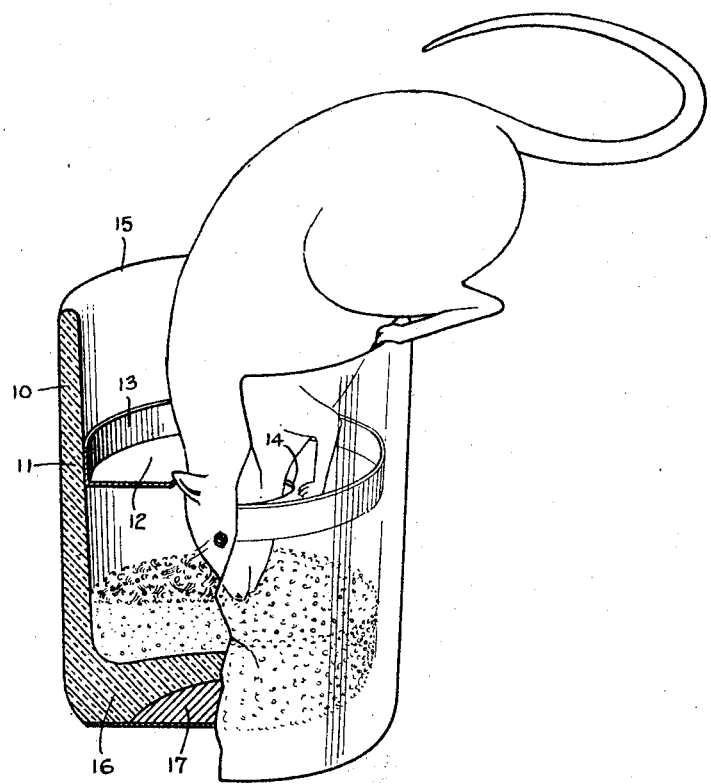
INVENTOR
Harold Levine
BY
J.T. Basseches
his ATTORNEY Patented Dec. 31, 1929

1,741,194

UNITED STATES PATENT OFFICE

HAROLD LEVINE, OF NEWARK, NEW JERSEY

RODENT OR THE LIKE DIET CUP

Application filed December 5, 1927. Serial No. 237,687.

This invention relates to a diet cup for use in nutritional studies of small animals, such as rodents or the like. The invention has for an object thereof the provision of a diet cup or receptacle, particularly useful in the feeding of small animals such as white rats or mice, in connection with the work carried out by various scientific laboratories engaged in nutritional research. Where I have attempted to feed dry diets to rats and mice, particularly with food specially prepared by expensive processes to determine the potency or activity of certain ingredients, such as devitaminized food or concentrated vitaminized food, especially where these foods lack certain dietary essentials, the rats are prone to scatter the food in the search for particles thereof which may be more suitable to them. This propensity on the part of the animals to scatter the food has not only made experimentation difficult because the scattered food becomes contaminated with the excreta-urine and feces and the wastage involved of this specially prepared food makes the experimental research highly expensive.

My invention, therefore, has for an object thereof the provision of a diet cup peculiarly adapted for feeding small animals, such as mice and rats, for use in nutritional studies and which will assure against scattering of the food or contamination thereof by the animal when feeding therefrom. The invention contemplates the provision of a receptacle for the food which is susceptible of being used for a measured quantity of food so that it may be weighed before and after the feeding of the animal and assure accuracy of the amount consumed by the animal, free from contamination, and without loss due to wastage of food. In its preferred embodiment, the invention resides in the provision of a receptacle having an opening which makes the interior thereof accessible to the animal to be fed merely by the insertion of its head, the opening to the interior being so positioned that the animal will require supporting itself for feeding purposes upon all its legs to thereby assure that nothing else but the mouth of the animal is used for picking up and consuming the food. Specifically, I provide a receptacle which is accessible to the interior thereof in a vertical direction, and which provides means for supporting the animal for feeding purposes only with great difficulty, and one which makes the food contained therein only accessible to the head of the animal intended to be fed therefrom.

Other objects of my invention reside in the provision of a nutritional diet cup useful in studies on small animals which insures againts scattering of the food, which is simple and inexpensive to manufacture, readily arranged for cleansing and maintaining sanitary and susceptible of use in a general nutritional laboratory for accurately carrying out experimental research.

To attain these objects and such further objects as may appear herein or be hereinafter pointed out, I make reference to the accompanying drawing forming part hereof, in which The figure is a perspective view illustrating the use of my device with portions broken away to show the detailed construction.

Making reference to the drawing, in my preferred form, I provide a receptacle 10 having substantially vertically disposed walls 11, the interior whereof are made slightly tapered. Interiorly disposed, I provide a collar 12 provided with an upwardly directed flange 13 and an orifice 14 at substantially the center thereof. The size of the collar and the form of the flange are so chosen that they engage the inner tapered walls to maintain the collar about one third of the distance from the mouth 15 of the vessel. The vessel 10 is preferably very heavily weighted at its bottom 16 and exteriorly thereof, at the hollow portion 17, it may be filled with some weighting material such as lead or the like.

In use, the dimensions of the vessel are chosen with consideration to the size of the small animal with which the experimental work is to be carried on. The height of the vessel will be such as to require that the animal climb to the top thereof and support itself at the rim. The size of the opening of the collar 12 is such as to prevent the animal from positioning itself interiorly thereof.

The only way the animal will be prevented from precipitating itself into the interior is by supporting itself upon the collar 12 with its forelegs. In this position, the animal may insert its head into the orifice 14 and thereby reach the interior where the food 18 is deposited, merely by the use of its head. When so formed, the diet cup provides means for supporting the animal with difficulty so that it will only support itself for eating by the use of its legs, the forelegs supporting the animal upon the shelf 12 and the hind legs upon the rim 15. The animal will not have any of its limbs free to cull over unaltered, unmodified or undesirably prepared food, thus assuring that no food will be scattered and that the animal will partake of the food as calculated by the investigator. The collar 12 being so formed as to permit entry only of the head of the animal further assures that the interior of the vessel containing the food is protected from contamination of execreta-urine or feces. In this way, the experimentalist may deposit a certain measured quantity of food and simply weigh at predetermined periods to determine the amount of food consumed by the animal.

Under certain conditions, the entire vessel may remain unsupported within the cage for the animal, in which event the vessel is weighted in the manner previously described, either by forming the bottom thereof of substantial thickness as when the same is made of glass or inserting a slug of lead at the bottom thereof within the cavity 17.

Though I have described the provision of a diet cup wherein one main vessel is provided with a single orifice, I may enlarge the same to include a plurality of orifices each of which is so positioned in respect to the side walls as to incorporate the features above outlined of supporting the animal for feeding purpose only with difficulty so that it will require utilizing its legs for supporting itself for eating position, leaving only the head free for eating purposes. Under such conditions, this type of device is particularly suitable in determining changes to be observed in the animal by average calculation.

Having thus described my invention and illustrated its use, what I claim as new and desire to secure by Letters Patent, is:

1. A diet cup including a transparent food container provided with downwardly tapered internal walls, in combination with a horizontal centrally apertured partition member provided with a tapered peripheral surface conforming with the internal walls of the container, and of such a size that it will rest frictionally within the said walls adjacent the middle of the container.

2. A diet cup for rodents or the like including in combination a transparent food container provided with downwardly tapered internal walls and a horizontally disposed partition member provided with a similarly tapered peripheral surface and of a size whereby the said partition member will rest frictionally within the walls of the container and adjacent the center thereof, and a centrally disposed aperture within the partition member permitting egress to the interior of the container.

3. A diet cup for rodents or the like including in combination a transparent food container provided with downwardly tapered internal walls, a readily slidable partition member adapted to divide the container into a food holding portion and a supporting portion of limited area for the animal, the said partition member being provided with a tapered peripheral surface conforming with the tapered internal walls of the container and of such a size as to rest frictionally within the said walls and adjacent the middle of the container, an orifice within the partition member connecting the aforementioned portions, the orifice being so disposed that the food within the food holding portion is accessible to the animal only by the insertion of its head through the said orifice.

In witness whereof I have hereunto signed my name this 28th day of November, 1927.

HAROLD LEVINE.